US008829868B2

(12) United States Patent
Waltman et al.

(10) Patent No.: US 8,829,868 B2
(45) Date of Patent: Sep. 9, 2014

(54) POWER CONVERTER APPARATUS AND METHOD WITH OUTPUT CURRENT SENSING AND COMPENSATION FOR CURRENT LIMIT/CURRENT SHARE OPERATION

(75) Inventors: Barry F. Waltman, Bothell, WA (US); Reid Adriance, Mill Creek, WA (US); Jay Allen Kuehny, Sammamish, WA (US); Stefan Jon Kristjansson, Shoreline, WA (US)

(73) Assignee: Crane Electronics, Inc., Redmond, WA (US)

( * ) Notice: Subject to any disclaimer, the term of this patent is extended or adjusted under 35 U.S.C. 154(b) by 508 days.

(21) Appl. No.: 13/185,172

(22) Filed: Jul. 18, 2011

(65) Prior Publication Data

US 2013/0021009 A1  Jan. 24, 2013

(51) Int. Cl.
- G05F 1/00 (2006.01)
- H02M 3/158 (2006.01)
- H02M 3/156 (2006.01)
- H02M 1/00 (2006.01)

(52) U.S. Cl.
CPC .... *H02M 3/1584* (2013.01); *H02M 2001/0025* (2013.01); *H02M 2001/0009* (2013.01); *H02M 3/156* (2013.01)
USPC ............................. 323/271; 323/272; 323/285

(58) Field of Classification Search
USPC .......... 323/266, 271, 272, 282, 283, 284, 285
See application file for complete search history.

(56) References Cited

U.S. PATENT DOCUMENTS

| | | |
|---|---|---|
| 4,635,002 A | 1/1987 | Riebeek |
| 4,743,835 A | 5/1988 | Bossé et al. |
| 5,418,502 A | 5/1995 | Ma et al. |
| 5,521,807 A | 5/1996 | Chen et al. |
| 5,631,822 A | 5/1997 | Silberkleit et al. |
| 5,694,303 A | 12/1997 | Silberkleit et al. |
| 6,043,705 A | 3/2000 | Jiang |
| 6,137,373 A | 10/2000 | Mori |
| 6,472,852 B1 | 10/2002 | Lethellier |
| 6,697,955 B1 | 2/2004 | Malik et al. |
| 6,998,901 B2 | 2/2006 | Lee |
| 7,061,212 B2 | 6/2006 | Phadke |
| 7,515,005 B2 | 4/2009 | Dan |

(Continued)

OTHER PUBLICATIONS

"Application Guide: Theory of Operation," MicroPower Direct, URL=http://micropowerdirect.com/PDF%20Files/Application%20Notes/Power%20Supply%20Theory%20of%20Operation.pdf, download date Apr. 18, 2012, 6 pages.

(Continued)

*Primary Examiner* — Jue Zhang
*Assistant Examiner* — Lakaisha Jackson
(74) *Attorney, Agent, or Firm* — Seed IP Law Group PLLC

(57) ABSTRACT

A power converter provides current limit/current share functionality, allowing use in a point-of-load architecture and/or in parallel with one or more other power converters. An inner current control loop may sense output current over only a portion of a duty cycle, for example at a low side active switch. The resulting signal is compensated, and may be level shifted, for example via a resistor divider network, and supplied to a current control amplifier. An outer voltage control loop may sense output voltage, and provide a voltage error signal from a voltage error amplifier to the resistor divider network. Power converters are operable as masters or slaves, and include sense input and trim input terminals.

21 Claims, 7 Drawing Sheets

(56) References Cited

U.S. PATENT DOCUMENTS

| | | | |
|---|---|---|---|
| 7,579,901 B2 | 8/2009 | Yamashita | |
| 7,742,318 B2 | 6/2010 | Fu et al. | |
| 8,067,992 B2 | 11/2011 | Chen et al. | |
| 8,358,118 B2 * | 1/2013 | Chen et al. | 323/285 |
| 8,552,589 B2 * | 10/2013 | Ghosh et al. | 307/64 |
| 2002/0071300 A1 | 6/2002 | Jang et al. | |
| 2006/0039172 A1 | 2/2006 | Soldano | |
| 2006/0132105 A1 | 6/2006 | Prasad et al. | |
| 2006/0220629 A1 * | 10/2006 | Saito et al. | 323/282 |
| 2008/0031014 A1 | 2/2008 | Young | |
| 2009/0174381 A1 | 7/2009 | Ojanen et al. | |
| 2009/0237057 A1 | 9/2009 | Dishman et al. | |
| 2009/0256547 A1 | 10/2009 | Akyildiz et al. | |
| 2009/0302775 A1 | 12/2009 | Alexandrov | |
| 2010/0014330 A1 | 1/2010 | Chang et al. | |
| 2010/0117715 A1 | 5/2010 | Ariyama | |
| 2010/0253309 A1 * | 10/2010 | Xi et al. | 323/288 |
| 2011/0241637 A1 | 10/2011 | Parker | |

OTHER PUBLICATIONS

"Buck converter," URL=http://en.wikipedia.org/wiki/Buck_converter, download date Jun. 23, 2011, 14 pages.

"Maximum Flexible Power (MFP) Single Output Point of Load: Technical Preview—3—6 VDC IN, 7 AMP, Non-Isolated DC/DV Converter," Crane Aerospace & Electronics Power Solutions, 2010, 17 pages.

"Step-gap "E" core swing chokes: Improved regulation and higher efficiency are possible when operating at minimum current levels," Technical Bulletin: Bulletin FC-S4, Magnetics Division, Spang & Company, Butler, Pennsylvania, 2001, 4 pages.

"Synchronous Rectification Aids Low-Voltage Power Supplies," Maxim Integrated Products, URL=http://www.maxim-ic.com/appnotes/index.mvp/id/652, download date Jun. 22, 2011, 6 pages.

Hughes, "Oscillator Apparatus and Method With Wide Adjustable Frequency Range," U.S. Appl. No. 13/185,152, filed Jul. 18, 2011, 37 pages.

Hughes et al., "Self Synchronizing Power Converter Apparatus and Method Suitable for Auxiliary Bias for Dynamic Load Applications," U.S. Appl. No. 13/185,217, filed Jul. 18, 2011, 44 Pages.

Hume et al., "Power Converter Apparatus and Method With Compensation for Light Load Conditions," U.S. Appl. No. 13/185,142, filed Jul. 18, 2011, 31 pages.

Waltman et al., "Input Control Apparatus and Method With Inrush Current, Under and Over Voltage Handling," U.S. Appl. No. 13/185,210, filed Jul. 18, 2011, 41 pages.

Waltman et al., "Power Converter Apparatus and Methods," U.S. Appl. No. 61/508,937, filed Jul. 18, 2011, 139 pages.

International Search Report, mailed Oct. 14, 2011, for PCT/US2011/030778, 3 pages.

Kristjansson et al., "Solutions to Today's Low Voltage Power Design Challenges Using High-Efficiency, Non-Isolated Point of Load Converters: A Discussion of the Interpoint™ MFP Series™ Point of Load Converter," Crane Aerospace & Electronics, Power Solutions—Interpoint Products, Redmond, WA, Oct. 2011, Revised Jan. 2012, 25 pages.

Merriam-Webster, "Directly," retrieved from http://www.merriam-webster.com/dictionary/directly, on Nov. 6, 2012, 1 page.

Xing et al., "Power System Architecture with Back-Up Power for Servers," ERC Program of the National Science Foundation, 5 pages.

Hughes, "Oscillator Apparatus and Method With Wide Adjustable Frequency Range," Office Action mailed Jan. 28, 2014, for U.S. Appl. No. 13/185,152, 15 pages.

Hume et al., "Power Converter Apparatus and Method With Compensation for Light Load Conditions," Office Action mailed Nov. 6, 2013, for U.S. Appl. No. 13/185,142, 11 pages.

\* cited by examiner

POWER CONVERTER APPARATUS AND METHOD WITH OUTPUT CURRENT SENSING AND COMPENSATION FOR CURRENT LIMIT/CURRENT SHARE OPERATION

BACKGROUND

1. Technical Field

This disclosure is generally related to power converters, and is more particularly related to regulated power converters.

2. Description of the Related Art

Power converters are used to transform electrical energy, for example converting between alternating current (AC) and direct current (DC), adjusting (e.g., stepping up, stepping down) voltage levels and/or frequency.

Power converters take a large variety of forms. One of the most common forms is the switched-mode power converter or supply. Switched-mode power converters employ a switching regulator to efficiently convert voltage or current characteristics of electrical power. Switched-mode power converters typically employ a storage component (e.g., inductor, transformer, capacitor) and a switch that quickly switches between full ON and full OFF states, minimizing losses. Voltage regulation may be achieved by varying the ratio of ON to OFF time or duty cycle. Various topologies for switched-mode power converters are well known in the art including non-isolated and isolated topologies, for example boost converters, buck converters, synchronous buck converters, buck-boost converters, and fly-back converters.

In the interest of efficiency, digital logic technology is employing ever lower voltage or potential logic levels. This requires power converters to deliver the lower voltages at higher currents level. To meet this requirement, power converters are employing more energy efficient designs. Power converters are also increasingly being located in close proximity to the load in as point of load (POL) converters in a POL scheme. These power converters must generate very low voltage levels (e.g., less than 1V) at increasingly higher current levels (e.g., greater than 10 A). These relatively high current levels may be difficult to achieve with a single power converter.

Manufacturers are increasingly employing POL schemes in light of the widely varying voltage requirements in modern systems (e.g., computer systems). A POL scheme may be easier to design and/or fabricate, take up less area, and/or produce less interference than employing multiple different power buses. The POL schemes typically employ one or two power buses with a number of POL regulators located close to specific components or subsystems to be powered, for example microprocessors, field programmable gate arrays (FPGAs), application specific integrated circuits (ASICs), volatile memory. The POL regulators adjust voltage or potential to supply localized busses feeding the specific components or subsystems.

Some attempts at addressing the requirement for high currents at low voltages or potentials employ power converters with current limiting and current sharing functions. Those power converters may be coupled in parallel to each provide a portion of the current drawn by the load.

New approaches to providing power converters which can satisfy the demands for high currents and low voltages or potentials in an energy efficient and cost effective manner are desirable.

BRIEF SUMMARY

Existing approaches for controlling an output current of a power converter to accomplish current limiting and to force multiple power converters to share the output load current are not as efficient as might otherwise be desired. Typically, existing power converts require sensing of a complete current waveform of the output current of the power converter. There are numerous approaches to sensing the complete output current of the power converter. For example, a typical approach to deriving an output current signal is to sense the current in the output current path. Current sensing may be accomplished by various sensors, for instance resistive, magnetic and Hall effect sensors. These approaches are associated with significant issues, for instance lower sensitivity, lower efficiency, and the need for high common mode rejection due to the wide (e.g., 4:1) range of the output voltage or potential.

Additionally, there are a variety of problems in implementing a current limit/current share function in a power converter. For example, deriving an accurate output current signal without severely impacting the efficiency of the converter. Also for example, signal integrity degradation of the signal resulting from common mode noise/current. As a further example, voltage level shift degradation may occur. Further problems may include difficult to predict current limit level and/or difficulty in obtaining accurate sharing of the load current in a parallel current share mode configuration.

Further, existing approaches tend to be relatively complex, require a large number of parts, and/or may be less efficient than the approaches described herein.

Approaches described here may implement current limit and current sharing functions in a power converter with higher efficiency, lower parts count, and/or greater flexibility in selecting the current limit level than existing approaches.

The approaches described herein utilize an average current mode control methodology and structure to allow accurate control of the output current of a power converter. This allows for paralleling of power converters, with each converter sharing the total output power delivered to the load. This may provide more flexibility in application of the power converters.

The approaches described herein uses a unique combination of sensing only a portion of the total output current referenced to the converter ground with a compensation for a variance of the sensed current signal over the range of duty cycle operation of the power converter. Thus, the current limit and current sharing functionality of a power converter may be achieved with a higher efficiency than possible with existing approaches. Advantageously, the current sensing is referenced to the ground reference of the circuit, significantly reducing the complexity of deriving a signal representative of the output current of the power converter. The derived current sense signal may be compensated for changes in duty cycle with a signal that is a function of 1−D (i.e., one minus duty cycle) of the power converter.

The approaches described herein provide a POL power converter design that facilitates the ability to parallel individual power converters, each power converter providing a portion of the total output load current. Two or more power converters may be operated in a current sharing mode, to supply the current draw of a commonly coupled component or subsystem.

The high degree of accuracy of the current share function with this implementation is achieved by utilization of average current mode control. As compared to existing approaches, the approach described herein may advantageously provide one or more of: 1) current limiting function to protect the converter from a load fault condition; 2) current sharing function using average current mode control to generate higher output currents; 3) higher efficiency; 4) lower component count; and/or 5) flexibility in selecting the current limit level.

A method of operating a first switch mode power converter may be summarized as including sensing an output current of the first switch mode power converter with reference to a ground of a converter circuit of the first switch mode power converter over only a portion of a waveform of the output current; compensating a sensed current signal that is proportional to the sensed output current at least for any variation in a duty cycle of a portion of the converter circuit of the first switch mode power converter; averaging a signal that is at least proportional to a compensated sensed current signal to produce an averaged signal; and controlling the circuit of the first switch mode power converter based at least in part on the averaged signal.

The method may further include level shifting the compensated sensed current signal to produce a level shifted compensated sensed current signal, wherein averaging a signal that is at least proportional to the compensated sensed current signal includes averaging the level shifted compensated sensed current signal. Sensing an output current with reference to a ground of a converter circuit of the power converter over only a portion of a waveform of the output current may include sensing the output current with reference to the ground on a low side of a switch of the circuit. The switch mode power converter may be a synchronous buck converter having an active high side switch and an active low side switch, and sensing an output current with reference to a ground of a converter circuit of the power converter over only a portion of a waveform of the output current may include sensing the output current with reference to the ground at a source of the active low side switch only over an ON duty cycle portion of the active low side switch.

The method may further include determining a compensation signal that is a direct function of the duty cycle of the portion of the converter circuit of the first switch mode power converter; scaling the compensation signal; and wherein compensating a sensed current signal that is proportional to the sensed output current at least for any variation in a duty cycle of the circuit includes summing a scaled compensation signal with the sensed current signal that is at least proportional to the sensed output current. The duty cycle may be the duty cycle of a high side switch of the circuit and scaling the compensation signal may include scaling the compensation signal to account for a voltage level offset.

The method may further include sensing an output voltage of the first switch mode power converter; producing a voltage error signal indicative of an error between the sensed voltage and a reference voltage; and controlling the converter circuit of the first switch mode power converter based at least in part on the voltage error signal. Sensing an output voltage of the first switch mode power converter may include voltage sensing via a voltage sense resistor network.

The method may further include switching between the voltage error signal and a voltage input from a second switch mode power converter to operate the first and the second switch mode power converters in a current sharing mode to supply a common load.

The method wherein the first switch mode power converter includes a voltage error amplifier operable to produce the voltage error signal may further include feeding the voltage error signal to the current error amplifier.

The method wherein the first switch mode power converter includes a current control amplifier having a positive pin and a negative pin, the current control amplifier operable to produce the averaged signal, may further include maintaining the positive pin of the current control amplifier more positive than the negative pin of the current control amplifier during any short circuit condition.

A first switch mode power converter may be summarized as including a converter circuit including at least one inductor, at least one high side active switch and at least one low side active switch, at least one high side active switch selectively operable to electrically couple the at least one inductor to a voltage input of the first switch mode power converter and the at least one low side active switch selectively operable to electrically couple the at least one inductor to a ground of the first switch mode power converter; means for sensing an output current of the low side switch active switch with reference to the ground over an ON duty cycle portion of the low side active switch; means for compensating sensed current signal for a variation in duty cycle and level shifting the compensated sensed current signal; means for averaging a level shifted compensated sensed signal; and means for controlling the high and the low side active switches based at least in part on the averaged signal.

A first switch mode power converter may be summarized as including a converter circuit including at least one inductor and at least a first active switch; an output current sensor that senses an output current of the converter circuit with reference to a ground of the converter circuit over only a portion of a waveform of the output current; a compensation circuit coupled to receive a sensed current signal that is proportional to the sensed output current from the output current sensor and to compensate the sensed current signal at least for any variation in a duty cycle of the first active switch of the converter circuit; a current control amplifier that averages the signal that is at least proportional to a compensated sensed current signal to produce an averaged signal; and a drive controller coupled to the current control amplifier to receive the averaged signal and is coupled to drive at least the first active switch of the converter circuit based at least in part on the averaged signal produced by the current control amplifier. The compensation circuit level may shift the compensated sensed current signal, and the current control amplifier may be coupled to receive a level shifted compensated sensed current signal from the compensation circuit. The first active switch may be a high side switch and the converter circuit may include at least a second active switch which is a low side switch, and wherein the output current sensor may sense the output current with reference to the ground on a low side of the low side active switch. The compensation circuit may be coupled to receive a signal indicative of one minus a duty cycle of the high side switch and may determine a compensation signal that may be a direct function of the one minus the duty cycle of the high side switch, may scale the compensation signal, and may sum the scaled compensation signal with the sensed current signal. The compensation circuit may scale the compensation signal to account for a difference between the duty cycle of a high side switch and a low side switch duty cycle of the low side switch of the converter circuit.

The first switch mode power converter may further include a voltage error amplifier coupled to receive a signal indicative of an output voltage of the converter circuit and a signal indicative of at least a reference voltage, the voltage error amplifier operable to provide a voltage error signal indicative of an error between the output voltage and the reference voltage to the current control amplifier.

The first switch mode power converter may further include a voltage sense resistor network coupled to provide the signal indicative of the output voltage to the voltage error amplifier. The compensation circuit may include a switch that selectively couples an input of the current control amplifier to a node between an output of the voltage error amplifier and a shared line, the shared lined coupleable to receive a voltage input from a second switch mode power converter to operate the first and the second switch mode power converters in a current sharing mode to supply current in parallel to a common load. An output of the voltage error amplifier may be coupled to an input of the current error amplifier. The compensation circuit may include a common emitter stage that drives a shared line when configured as a master that is able to supply a voltage output from the first switch mode power converter through a share pin to operate a second switch mode power converter configured as a slave through a slave pin thereof in a current sharing mode to supply a common load.

The first switch mode power converter wherein the current control amplifier has a positive pin and a negative pin may further include a number of resistors selected and coupled to maintain the positive pin of the current control amplifier more positive than the negative pin of the current control amplifier during a short circuit condition.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with power conversion topologies have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and the appended claims, references are made to a "node" or "nodes." It is understood that a node may be a pad, a pin, a junction, a connector, a wire, or any other point recognizable by one of ordinary skill in the art as being suitable for making an electrical connection within an integrated circuit, on a circuit board, in a chassis or the like.

The headings and Abstract of the Disclosure provided herein are for convenience only and do not interpret the scope or meaning of the embodiments.

Figure 1:
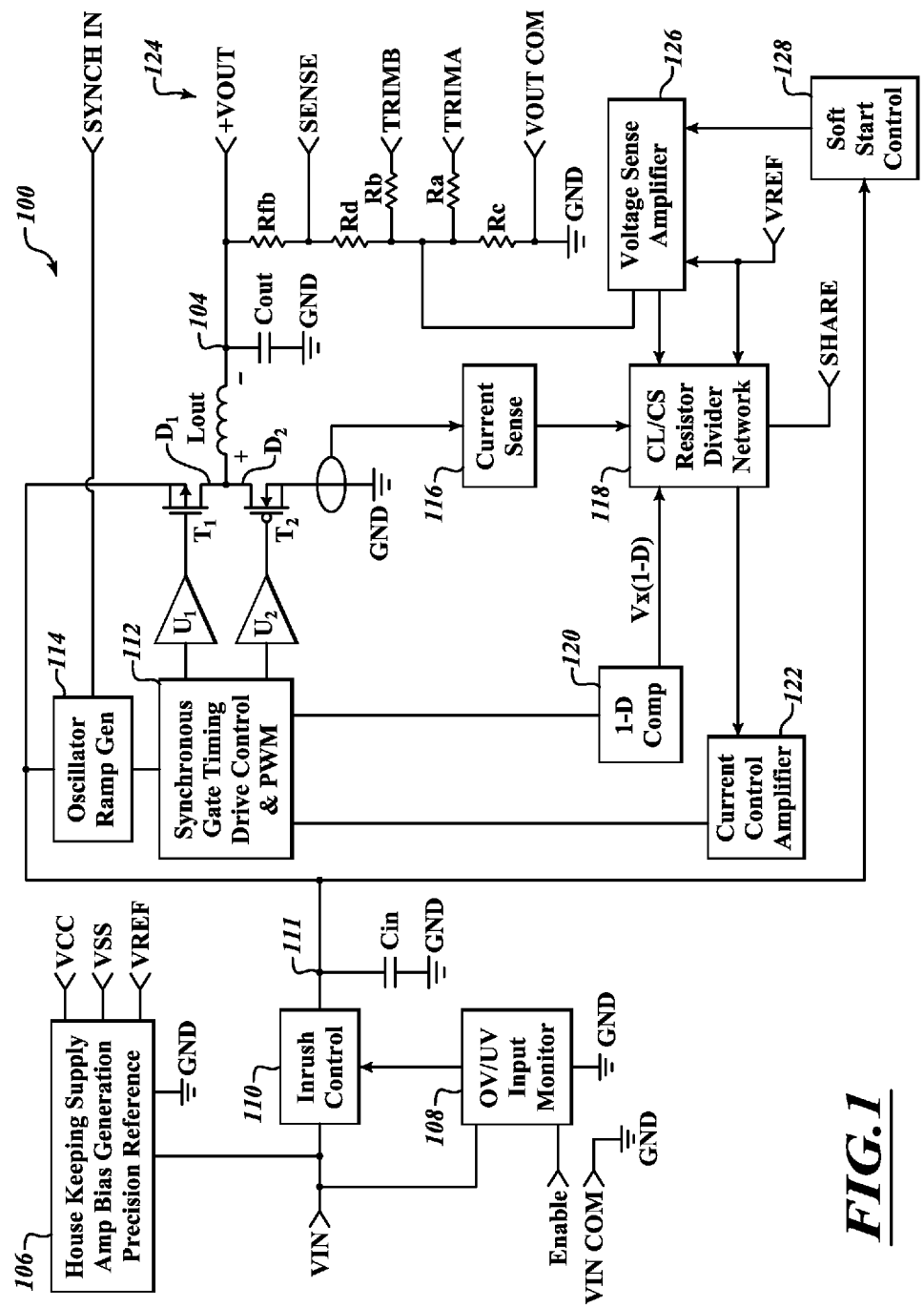
FIG. 1 is a schematic diagram of a power converter including an inner current loop and an outer voltage loop thereof, according to one illustrated embodiment.

FIG. 1 shows a power converter 100, according to one illustrated embodiment. The description of FIG. 1 provides an overview of the structure and operation of the power converter 100, which structure and operation are described in further detail with reference to FIGS. 2-7.

The power converter 100 may, for example, take the form of a DC/DC power converter to convert (e.g., raise, lower) DC voltages. The power converter 100 may, for example, include an output inductor Lout electrically coupled to an output terminal +VOUT, a first active switch (i.e., high side active switch) T1 selectively operable to electrically couple the inductor Lout to a voltage input terminal VIN. A second device T2 electrically couples the output inductor Lout to a ground GND which is in turn electrically coupled to a ground or common input terminal VIN COM and a ground or common output terminal VOUT COM.

As illustrated, the power converter 100 may advantageously take the form of a synchronous buck converter, operable to lower a DC voltage. Where implemented as a synchronous buck converter, the second device T2 takes the form of a second active switch (i.e., high side active switch), selectively operable to electrically couple the output inductor Lout to ground GND. The power converter 100 may take forms other than a synchronous buck converter, for example a buck converter where the second device takes the form of a passive device, such as a diode (not shown).

The switches T1, T2 may take a variety of forms suitable for handling expected currents, voltages and/or power. For example, the switches T1, T2 make take the form of an active device, such as one or more metal oxide semiconductor field effect transistors (MOSFETs). As illustrated in the Figures, the first or high side switch T1 may take the form of P-Channel MOSFET, while the second or low side switch T2 make take the form of an N-Channel MOSFET. The output inductor Lout may be coupled via a node 102 to the drains D1, D2 of the MOSFET switches T1, T2 respectively. The power converter 100 may employ other types of switches, for example insulated gate bipolar transistors (IGBTs). While only one respective MOSFET is illustrated, each of the first and/or second switches T1, T2 may include two or more transistors electrically coupled in parallel.

The power converter 100 may include an output capacitor Cout electrically coupled between ground GND and a node 104 between the output inductor Lout and the output terminal +VOUT. Output capacitor Cout may smooth the output supplied to the output terminal +VOUT.

On an input side, the power converter 100 may include an auxiliary power supply and voltage reference generation block 106, an over voltage/under voltage monitor block 108 and/or an "in rush" current control block 110.

The auxiliary power supply and voltage reference generation block 106 implements a house keeping supply generation function, amplifier bias generation function and precision reference generation function, resulting in a positive supply voltage or potential VCC, a negative supply voltage or potential or ground VSS, and a precision reference voltage or potential VREF. The structure and operation of the auxiliary power supply and voltage reference generation block 106 can take any existing form, and is not a subject of this application so is not described in further detail.

The over voltage/under voltage monitor block 108 monitors instances of over voltage and/or under voltage conditions, supplying a control signal via a control line (not called out in FIG. 1) to the "in rush" current control block 110 as needed. The over voltage/under voltage monitor block 108 or other components may be triggered via an enable signal via an enable input terminal ENABLE. The "inrush" current control block 110 controls "inrush" current, directly limiting current to input capacitor(s) Cin, reducing electrical stresses on the power converter 100 and any system into which the power converter 100 is incorporated. Power converters 100 typically employ large internal bulk filter capacitors to filter the input power to reduce noise conducted out of the power converter 100, back upstream to the source of the input power. The input capacitor Cin is electrically coupled between ground GND and a node 111 between the "inrush" current control block 110 and the first active switch T1. The "inrush" current control block 110 is configured to control the "inrush" current that flows to the input capacitor, particularly at initial application of the input voltage or potential VIN.

The structure and operation of the over voltage/under voltage monitor block 108, the "inrush" current control block 110, and the input capacitor(s) Cin may take any existing form, and are not subjects of this application so are not described in further detail.

Figure 2:
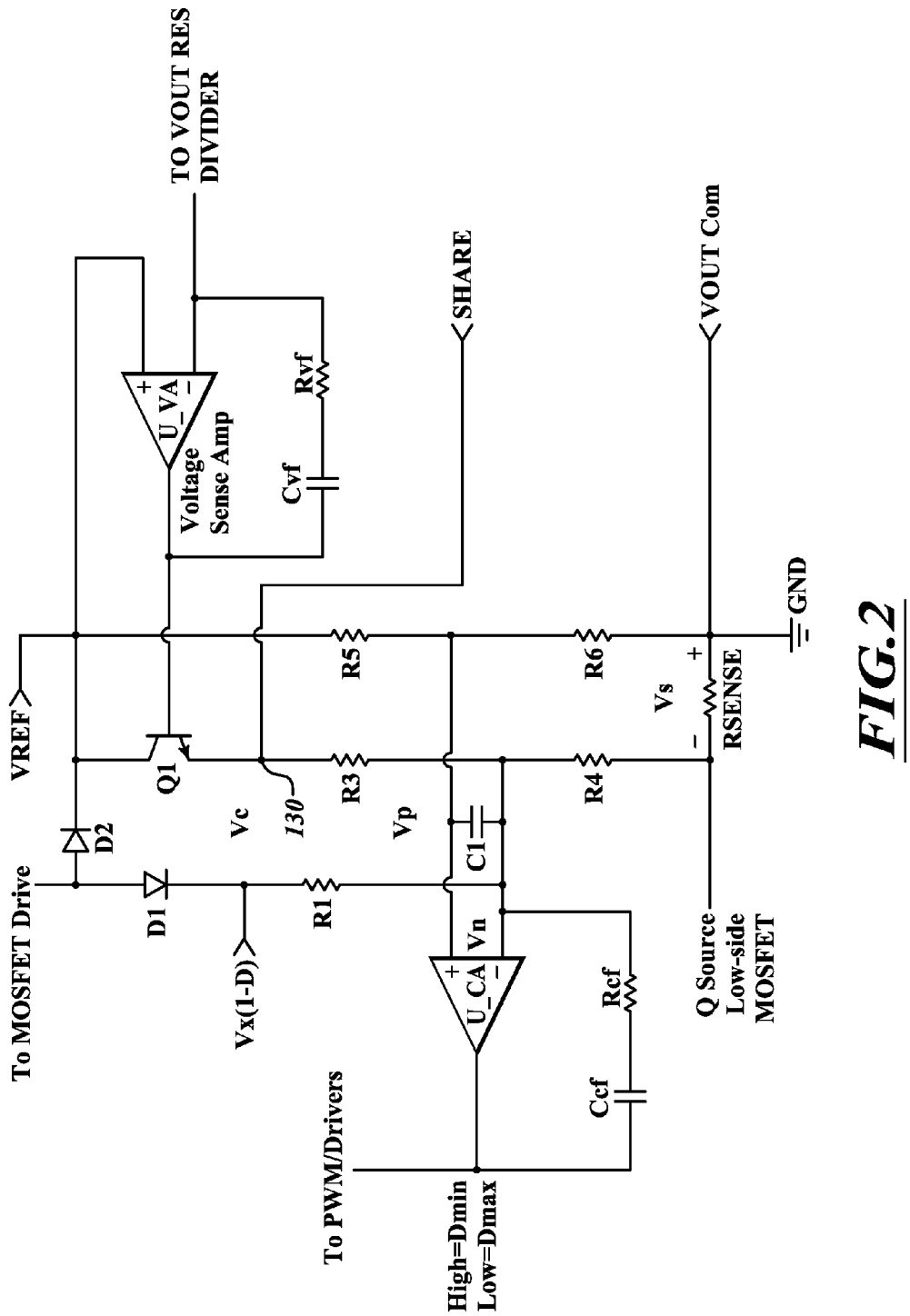
FIG. 2 is a detailed electrical schematic diagram of the inner current loop and the outer voltage loop illustrated in FIG. 1, according to one illustrated embodiment.

Control of the converter circuit (e.g., synchronous buck converter) is realized via a number of components or assemblies, represented in FIGS. 1 and 2 as blocks.

The power converter 100 includes a synchronous gate timing drive control and pulse width modulation (PWM) block 112 and an oscillator ramp generation block 114. The oscillator ramp generation block 114 generates an oscillating ramp signal and provides the oscillating ramp signal to the synchronous gate timing drive control and pulse width modulation block 112. The oscillator ramp generation block 114 may optionally receive a synchronization signal via a synchronization input terminal SYNC IN, to synchronize operation with one or more other power converters or other devices or systems, for example a clock of a system in which power converter 100 is installed. The synchronous gate timing drive control and pulse width modulation block 112 generates gate control signals to control the switches T1, T2, for example via amplifiers U1, U2, respectively. The synchronous gate timing drive control and pulse width modulation block 112 may optionally receive a share signal via a share input terminal SHARE from one or more other power converters, for example when electrically coupled to a common load for current sharing operation. The structure and operation of the synchronous gate timing drive control and pulse width modulation (PWM) block 112 and the oscillator ramp generation block 114 can take any existing form, and are not subjects of this application, so are not described in further detail.

At a high level, the power converter 100 utilizes an inner current control loop and an outer voltage control loop. The inner current control loop is implemented via a current sense block 116, a current limiting/current sharing (CL/CS) resistor network 118, a 1−D (one minus duty cycle) compensation block 120 and a current control amplifier 122. The outer voltage control loop is implemented by a voltage sense resistor divider network 124 and a voltage error amplifier 126 which feeds the CL/CS resistor network 118 to ultimately control the output voltage or potential of the power converter 100.

With respect to the inner current control loop, the current sense block 116 implements current sensing over a portion of a cycle of the power converter 100, for example over the ON or CLOSED portion of one of the switches T1, T2. The current sense block 116 provides a signal to the CL/CS resistor divider network 118 to control the current control amplifier 122, which signal is indicative of the sensed current. For example, the current sense block 116 may sense current over each portion of a cycle during which portion the low side switch T2 is ON or CLOSED (i.e., conducting), electrically coupling the output inductor Lout to ground GND, while neglecting those portions of the cycle when the low side switch T2 is OFF or OPEN.

Where the output current of the synchronous buck converter circuit in the power converter 100 is sensed at the low side switch (e.g., MOSFET synchronous switch) T2, the average of this sensed current is equal to $Io*(1-D)$, where D is defined as the duty cycle of the high side switch (e.g., MOSFET) T1. Since this signal is dependent on the duty cycle and negative in value, a compensation signal that is a direct function of the duty cycle is scaled via the 1−D compensation block 120, and summed with the sensed current signal by the CL/CS resistor network 118. The resultant signal is optionally level shifted in the CL/CS resistor network 118 to create a level shifted compensated signal. The level shifted compensated signal may then be averaged by the current control amplifier 122, and the averaged signal used to control the output current of the power converter 100.

This approach to current sensing presents both advantages and disadvantages. This current sensing approach may advantageously improve efficiency since only a portion (1−D) of the total output current of the power converter 100 is sensed. Also, the generated sensed current signal is directly referenced to the ground of the circuit, providing a significant simplification of the circuit implementation. However, the derived signal is disadvantageously a direct function of the duty cycle D of the high side switch T1 of the power converter 100. However, this disadvantage may be effectively overcome by a unique approach of summing in a compensation signal $Vx(1-D)$ that sufficiently compensates for the duty cycle variation in the sensed current signal. As explained above, the summation of the compensation signal may be accomplished via the CL/CS resistor divider network 118.

The current control amplifier 122 generates control signals based at least on the level shifted compensated signals from the CL/CS resistor divider network 117 to control the synchronous gate timing drive control and pulse width modulation block 112.

With respect to the inner current control loop, the voltage sense resistor network 124 (e.g., resistor Rfb coupled between voltage output terminal +VOUT and sense terminal SENSE, divider resistors Rd, Rc, and trim resistors Rb, Ra coupled to trim terminals TRIMB, TRIMA, respectively) senses voltage or potential at the output terminal +VOUT with respect to the ground terminal VOUTCOM. The voltage sense resistor network 124 supplies a signal indicative of the sensed voltage or potential to the voltage sense amplifier 126. The voltage sense amplifier 126 generates a voltage error signal which indicates a difference between the sensed voltage or potential and a reference voltage or potential. Hence, the voltage sense amplifier 126 is interchangeably referred to herein and in the claims as voltage error amplifier 126. The voltage error amplifier 126 provides the voltage error signal to the current control amplifier 122 via the CL/CS resistor divider network 118, for use in generating the control signals supplied to the synchronous gate timing drive control and pulse width modulation block 112 to control output voltage or potential of the power converter 100.

The power converter 100 may optionally include a soft start control block 128. The soft start control block 128 may receive the precision voltage reference signal VREF from the auxiliary power supply and voltage reference generation block 106. The soft start control block 128 may control various soft start characteristics of the power converter 100, for example soft-start time, current limit thresholds, current limit on-time and output voltage or potential level at which control is handed over to a main control loop. The soft start control block 128 may, for example, provide a progressively increasing pulse width, forming a startup voltage ramp which is proportional to a level of a supply voltage VCC, for instance without the need of an external capacitor. The structure and operation of the soft start control block 128 can take any existing form, and is not a subject of this application so is not described in further detail.

FIG. 2 shows the inner current loop and the outer voltage loop illustrated in FIG. 1, according to one illustrated embodiment.

As illustrated, the inner current control loop includes a current control amplifier (e.g., operational amplifier) U_CA while the outer voltage control loop includes a voltage error amplifier (e.g., operational amplifier) U_VA.

The interface from the output of the current control amplifier U_CA to the gate timing drive control and PWM module 112 (FIG. 1) requires the output of the current control amplifier U_CA to be voltage level HIGH to generate a minimum duty cycle and to be voltage level LOW to generate maximum duty cycle. The current control amplifier U_CA averages a voltage across a sense resistor RSENSE produced by the switched current in the low side switch (e.g., MOSFET) T2 (FIG. 1) of the switching power path, which is equal to (1−D) times the DC output current where D is the converter duty ratio or duty cycle of the high side switch T1 (FIG. 1). The Vx signal input to a resistor R1, a constant voltage switched with approximately the same (1−D) timing as the RSENSE current, allows the current control amplifier U_CA to regulate for a constant output current independently of duty ratio. The resistor R1 is also coupled to a diode D1.

The voltage or potential Vc at a node 130 supplied to a resistor R3 is either the output voltage or potential of the voltage error amplifier U_VA or a voltage or potential on a SHARE input, pin or terminal. The voltage or potential on the SHARE input, pin or terminal is supplied from another power converter unit, as an active input to control the output current of the power converter 100. For limiting output current, the voltage or potential Vc at the node 130 is clamped to a maximum of approximately VREF via a transistor Q1. A divider formed by resistors R5, R6 provides an offset to either cancel a nominal clamped voltage or potential Vc at the node 130 input during current limiting, or to provide an intentional shift of current limit value with duty cycle. This bias also moves the reference point off of ground so that the current control amplifier U_CA can be powered from a single supply. An output of the current control amplifier U_CA is coupled to a negative pin thereof via a current forward capacitor Ccf and current forward resistor Rcf. A capacitor C1 is coupled across the positive and negative pins or inputs of the current control amplifier U_CA. An output of the voltage error amplifier U_CA is coupled to a negative pin thereof via a voltage forward capacitor Cvf and current forward resistor Rvf.

The 1−D compensation approach is best explained with a derivation of the controlling equation for the CL/CS resistor divider network 118 (FIG. 1). The derivation uses Millman's theorem to simplify the expressions and generate a design oriented equation that explicitly shows the impact of each signal summed in the CL/CS resistor divider network 118 (FIG. 1).

Solving for the voltages at each input of the current control amplifier U_CA:

$$V\text{positive}(Vp) = (VREF/R5) * R5 \| R6$$

$$V\text{negative}(Vn) = [Vc/R3 + ((1-D)*Vx)/R1 - (Iout*(1-D)*RSENSE)/R4] * R1\|R3\|R4$$

Setting Vp=Vn, and solving for Iout:

$$Iout = [Vc*\alpha 3 - VREF*\alpha 5 + (1-D)*Vx*\alpha 1]/(RSENSE*(1-D)*\alpha 4)$$

Where $$\alpha 1 = (R1\|R3\|R4)/R1$$

$$\alpha 3 = (R1\|R3\|R4)/R3$$

$$\alpha 4 = (R1\|R3\|R4)/R4$$

$$\alpha 5 = (R5\|R6)/R5$$

The resulting equation shows that the dependence on 1-D for either the maximum output current Iout or a current limit trip point (C.L.T.P) for an overload fault condition, can be greatly reduced with adjustment of the terms $\alpha 1$, $\alpha 3$, $\alpha 4$ & $\alpha 5$, or 1-D compensation. The optimum 1-D compensation may also be made to satisfy the following additional operating constraints.

Minimum Duty Cycle Operation

Minimum duty cycle condition results when the output voltage of the voltage error amplifier U_VA drives LOW, generating minimum output voltage and consequently reduced duty cycle. The Vx(1-D) offset signal simultaneously increases to Vx at 0% duty cycle. To reach and maintain this state, the resulting inputs to the current error amplifier U_CA must be such that a positive pin thereof is guaranteed to be greater than a negative pin thereof, guaranteeing a HIGH output state at an output of the current control amplifier U_CA. This is shown by the following equation:

$$Vp > Vn$$

$$VREF*\alpha 5 > Vx*+1$$

$$(VREF*R6)/(R6+R5) > (Vx*R4\|R3)/(R4\|R3+R1)$$

During the minimum duty cycle condition, Vx is HIGH, Vc is LOW resulting in the above equation.

Short Circuit Protection/Lock-on Protection

A short circuit condition on the output of the power converter 100 creates the possibility of a 100% duty cycle condition. This 100% duty cycle condition will be indefinite if not mitigated. If 100% duty cycle is ever achieved, the low side current sense in the power converter 100 will not sense an output current, which will result in the current control loop attempting to indefinitely drive to a higher duty cycle.

This state is most likely to occur at the application of a hard short circuit on the output. Further precipitating a 100% lock-on condition is the voltage feed forward function in the ramp generator circuit 114 (FIG. 1), a function often utilized in power converters to compensate gain as the input voltage or potential changes. During a load short condition, the input line is pulled low due to impedance drop in the input source connections. The oscillator ramp amplitude can consequently drop below the reference of the comparator and throw the circuit into 100% duty cycle before the control system has time to compensate.

This state can be avoided with a number of different approaches. The chance of this occurring can be alleviated or remedied by reducing feed forward or by sufficiently increasing the bandwidth of the current control loop so as to react fast enough to shut down the power converter. Other possible approaches include logic which monitors for a lock-on state and resets or prevents the condition from occurring. Blanking the oscillator ramp is also a viable approach, which forces a switch signal to always appear at the switches T1, T2 (FIG. 1) and thus remove the possibility of 100% duty cycle. However each of these approaches disadvantageously requires additional components.

In the power converter 100, the undesirable 100% duty cycle state may be avoided through the careful selection of the current error amplifier resistors such that the positive pin of the current error amplifier U_CA is guaranteed to be greater than the negative pin of the current error amplifier U_CA in a short circuit condition:

$$Vp > Vn$$

$$VREF*\alpha5 > Vc*\alpha3$$

$$(VREF*R6)/(R6+R5) > (Vc*R1\|R4)/(R1\|R4+R3)$$

During the short circuit condition, Vc is HIGH, Vx is LOW resulting in the above equation.

Current Limit Trip Point

The final constraint that the Current Limit Trip Point (C.L.T.P.) must meet a specification range that does not interfere with normal operation, and is not so high as to not offer reasonable current limit protection. The C.L.T.P set point range is represented by the following equation:

$$CLTP.\min < (Vc*\alpha3 - VREF*\alpha5 + (1-D)*Vx*\alpha1)/(RSENSE*(1-D)*\alpha4) < CLTP.\max$$

where $$\alpha1 = (R1\|R3\|R4)/R1$$

$$\alpha3 = (R1\|R3\|R4)/R3$$

$$\alpha4 = (R1\|R3\|R4)/R4$$

$$\alpha5 = (R5\|R6)/R5$$

In summary, the described power converter 100 may meet the above constraint relationships, guaranteeing that minimum duty cycle can be maintained, that 100% duty cycle lock-on is prevented, and that the C.L.T.P. can meet minimum specification without being too high.

Figure 3:
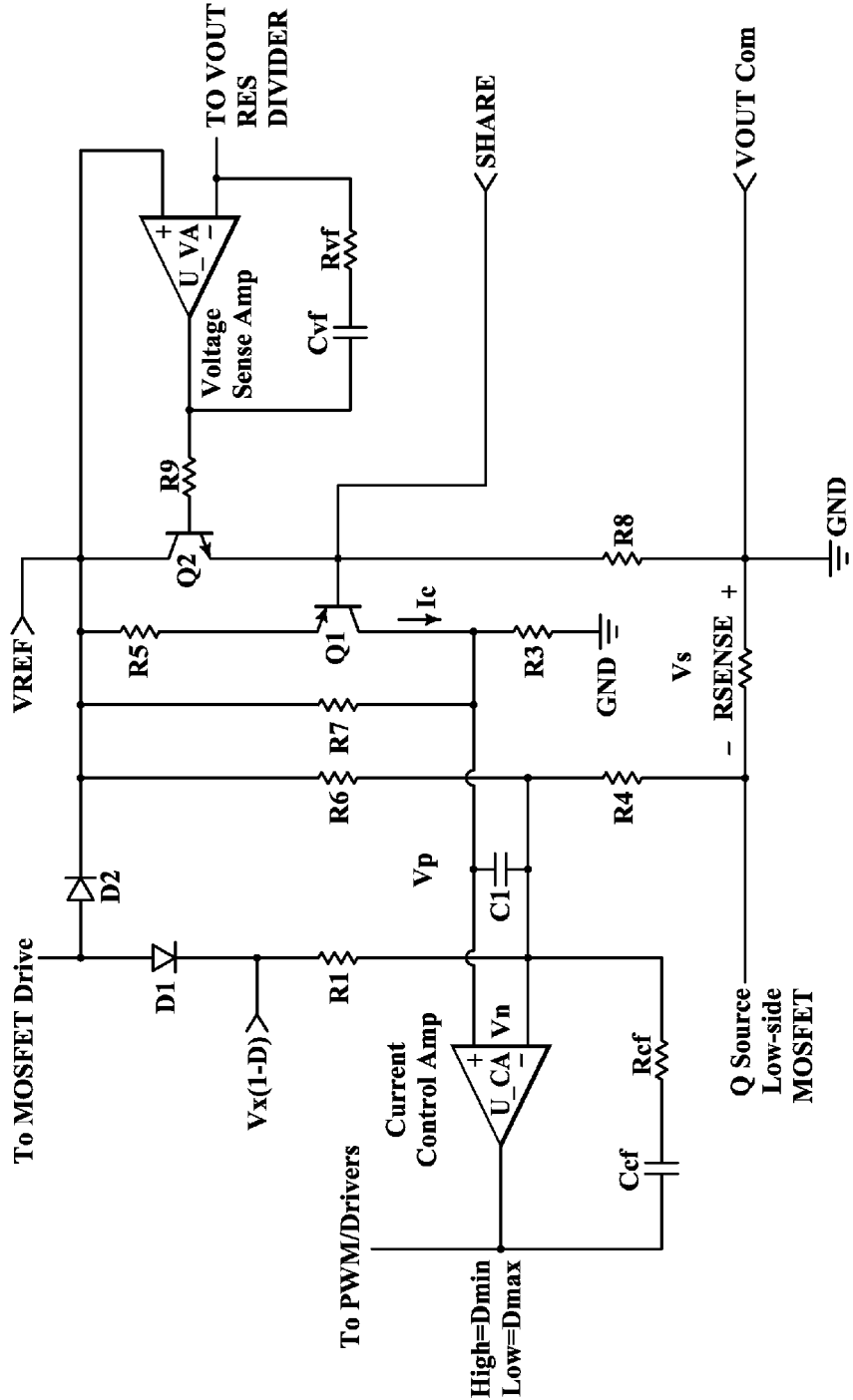
FIG. 3 is a detailed electrical schematic diagram of the inner current loop and the outer voltage loop illustrated in FIG. 1, according to another illustrated embodiment.

FIG. 3 shows the inner current loop and the outer voltage loop illustrated in FIG. 1, according to another illustrated embodiment. Many of the structures or components are similar or even identical to those discussed with reference to FIG. 2. Some of the similar or identical components are identified by the same reference numbers as used in FIG. 2, and detailed discussion of such may not be repeated in the interest of brevity.

In embodiment of FIG. 3, the small working range and the sensitivity to error at the inputs of the current control amplifier U_CA present a few possible limitations. First, a change to any gain term at the current control amplifier junction has a dramatic effect on the C.L.T.P. Second, the voltage error amplifier U_VA is forced to drive into the current sense scaling resistor which must be relatively small to enable proper current sense drive and thus the gain of the voltage error amplifier U_VA is significantly reduced. Additionally, at any condition three signals must be summed and compared against a static reference, yielding higher sensitivity to error than might otherwise be desired. Lastly, although the Vx(1−D) compensation signal properly level shifts the negative Vsense(1−D) signal, Vx(1−D) signal can only fully remove the 1−D component at one condition and simply be scaled to reduce its effect at other operating points. Thus, the C.L.T.P is to some degree always a function of duty ratio.

The embodiment of FIG. 3 may overcome some or all of the limitations of the embodiment of FIG. 2, and may reduce complexity as well.

As illustrated in FIG. 3, the control signal from the voltage error amplifier U_VA is fed into the positive input or pin of the operational amplifier U_CA. Since the gain of the voltage error amplifier U_VA is dependent on the value of resistor R3, the SHARE line is decoupled from the resistor R3 and is driven from a common emitter stage, allowing numerous power converter units to current share without affecting the performance or integrity of the current control loop. A pair of resistors R6 and R7 can be used as bias resistors to raise a DC operating point at the inputs of the current control amplifier U_CA to a level sufficiently above ground, or not used in cases were positive bias on the pins of the current control amplifier U_CA is not required.

Similar to the embodiment of FIG. 2, a derivation of the Iout current relationship using Millman's Theorem produces a design oriented equation that explicitly shows the impact of each signal summed in the CL/CS resistor divider network 118 (FIG. 1) can be derived.

Solving for the voltages at each input of the current control amplifier U_CA:

$$V\text{positive}(Vp) = (VREF/R7 + Ic)*R3\|R7$$

$$V\text{negative}(Vn) = [VREF/R6 + ((1-D)*Vx)/R1 - (Iout*(1-D)*RSENSE)/R4]*R1\|R4\|R6$$

Setting Vp=Vn, and solving for Iout $$Iout = [(1-D)*Vx*\beta1 + VREF*(\beta6-\beta7) - ic*Rp1]/(RSENSE*(1-D)*\beta4)$$

Where $$Rp1 = R3\|R7$$

$$\beta1 = (R1\|R4\|R6)/R1$$

$$\beta4 = (R1\|R4\|R6)/R4$$

$$\beta6 = (R1\|R4\|R6)/R6$$

$$\beta7 = (R3\|R7)/R7$$

The resulting equation is similar in form to that described in reference to FIG. 2. However, the implementation shows improvements over the embodiment of FIG. 3, in that the maximum Iout or current limit trip point (C.L.T.P) dependence on 1–D can be completely canceled with adjustment of the terms β6 & β7 to make the (β6–β7) equal to or nearly zero.

The optimum 1–D compensation of this embodiment can satisfy the same additional operating constraints as that of FIG. 2:

Minimum Duty Cycle Operation

Similar to the embodiment of FIG. 2, minimum duty cycle condition results when the output voltage of the voltage error amplifier U_VA drives LOW, generating minimum output voltage or potential and consequently reduced duty cycle. The Vx(1–D) offset signal simultaneously increases to Vx at 0% duty cycle. To reach and maintain this state the resulting inputs to the current control amplifier U_CA must be such that the positive pin is guaranteed to be greater than the negative pin, guaranteeing a HIGH output state at the output of the current control amplifier U_CA. This requirement is shown by the following equation:

$Vp > Vn$ $VREF*β7 + Ic*Rp1 > Vx*β1 + VREF*β6$ $VREF*R3/(R3+R7) + Ic*R3*R7/(R3+R7) > (Vx*R4\|R6)/(R4\|R6+R1) + VREF*R1\|R4/(R6+R1\|R4)$

During the minimum duty cycle condition, Vx is HIGH, Ic is fully ON resulting in the above equation.

Short Circuit Protection/Lock-on Protection

As in the embodiment of FIG. 2, the undesirable 100% duty cycle state is avoided through the careful selection of the current error amplifier resistors such that the positive pin of the current error amplifier U_CA is guaranteed to be greater than the negative pin of the current error amplifier U_CA in a short circuit condition:

$Vp > Vn$ $VREF*β7 > VREF*β6 - (Iout*(1-D)*RSENSE*(β4)$ $VREF*R3/(R3+R7) > (VREF*R1\|R4)/(R1\|R4+R6) - (Iout*(1-D)*RSENSE*R1\|R6/(R4+R1\|R6)$ During the short circuit condition, Vc is HIGH and Ic is OFF, Vx is LOW resulting in the above equation. Assuming the same lock-on state and conditions as before, at 100% duty cycle, Vx(1–D) goes low and the voltage error amplifier drives HIGH, thus cutting OFF Ic and the voltage at resistor R3. Consequently, if any current is sensed, the resistor R4 will pull the inverting pin of the current error amplifier U_CA below the positive pin of the current error amplifier U_CA and the power converter 100 will current limit.

Overload Current Limit Trip Point

With this implementation, as the current increases towards overload, the voltage error amplifier U_VA will again drive HIGH to maintain the output voltage or potential, driving Ic OFF and the voltage at resistor R3 LOW. Thus, at the C.L.T.P, the relationships are:

$Vpositive = Vnegative$ $VREF*β7 = Vx*(1-D)*β1 + VREF*β6 - (Iout*(1-D)*RSENSE*β4)$ This equation yields the following maximum Iout result:

$C.L.T.P = [(1-D)*Vx*β1 + VREF*(β6-β7)]/(RSENSE*(1-D)*β4)$

During the C.L.T.P condition, Vc is HIGH and Ic is OFF resulting in the above equation.

It can be seen that duty cycle dependence does come back into the equation, but it only exists as a small error term, which can be substantially reduced by minimizing the bias difference between the pins of the operational amplifier.

An additional improvement with this circuit is the voltage error amplifier U_VA is no longer forced to drive into the scaling resistor for the current sense signal and the forward voltage loop gain can now be independently set by the resistor R3 with no effect on the current limit.

In summary, this second approach again utilizes the fundamental (1–D) current sense and (1–D) compensation. The circuit implementation may improve load transient response, minimum duty cycle operation, inherent short circuit and lock-on protection, C.L.T.P. set point, and the ability to drive multiple power converter units from the share output pin SHARE without degrading the control loop or C.L.T.P set point.

Figure 4:
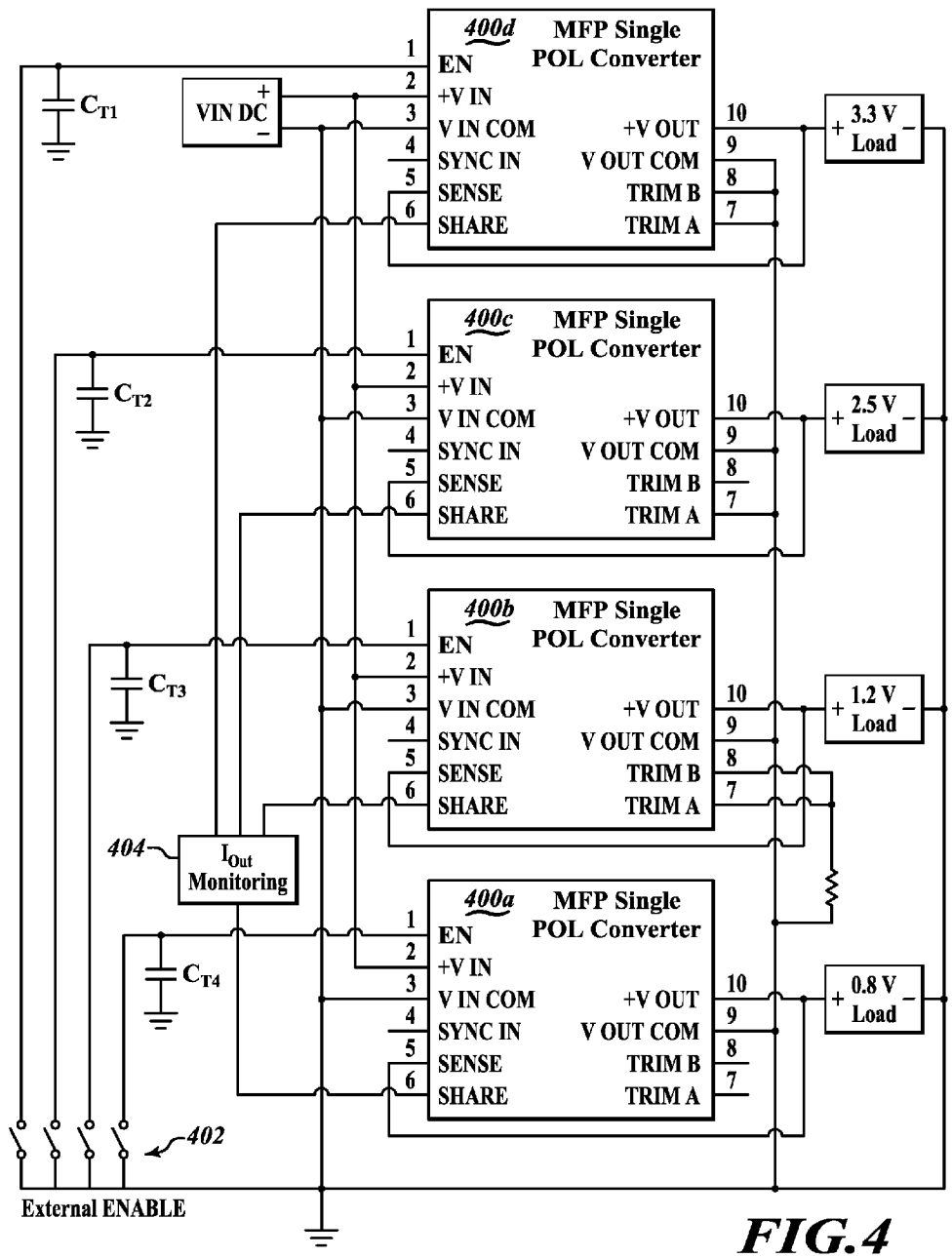
FIG. 4 is a schematic diagram of a number of power converters of FIG. 1 arranged as point-of-load devices, according to one illustrated embodiment.

FIG. 4 shows a number of power converters 400a, 400b, 400c, 400d (four illustrated, collectively 400) of FIG. 1 arranged as point-of-load devices, according to one illustrated embodiment.

The power converters may be electrically coupled to a common DC voltage or potential input VIN DC. The common DC voltage or potential input VIN DC may take any of a variety of forms including an output of a rectifier, a DC/DC converter, an isolating conversion stage, and/or a DC electrical power storage device such as an array of chemical battery cells or ultra-capacitors.

A first power converter 400a may be operated to provide an output at a first voltage or potential (e.g., 0.8V) to a first power bus to service a first load (e.g., 0.8V load). A second power converter 400b may be operated to provide an output at a second voltage or potential (e.g., 1.2V) to a second power bus to service a second load (e.g., 1.2V load). A third power converter 400c may be operated to provide an output at a third voltage or potential (e.g., 2.5V) to a third power bus to service a third load (e.g., 2.5V load). A fourth power converter 400d may be operated to provide an output at a fourth voltage or potential (e.g., 3.3V) to a fourth power bus to service a fourth load (e.g., 3.3V load).

Each of the power converters 400 may receive an enable signal via an enable line and switches, collectively 402. This allows remote operation (e.g., turn ON, turn OFF) of the respective power converters 400. The enable lines and switches 402 may be buffered with respective external timing capacitors CT1, CT2, CT3, CT4. Such may delay startup of the power converters 400. This delay is between application of power and beginning of internal power conversion. There is typically an additional delay as the power converter 400 begins normal startup sequence and ramps to final or nominal output voltage or potential.

Output current monitoring may be performed by appropriate monitoring circuitry 404 which receives signals from respective share pins SHARE of the power converters 400. As explained above, the power converters 400 may include a current sharing feature that allows multiple power converters 400 to operate as a single supply, capable of providing a total current that is the sum of the maximum current of the individual power converter units, when operated in parallel. Such current sharing operation is illustrated and discussed in reference to FIG. 5.

Figure 5:
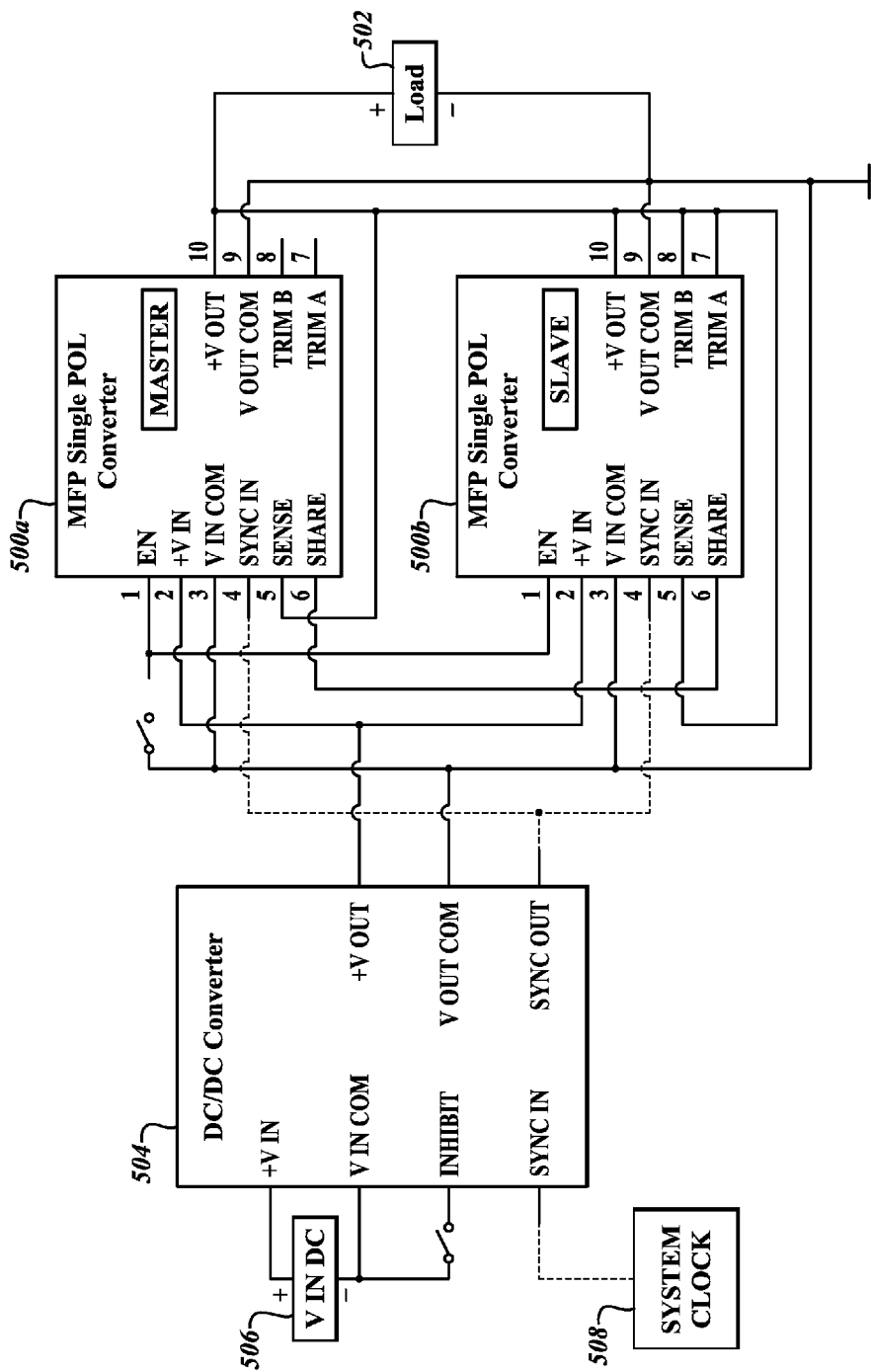
FIG. 5 is a schematic diagram of a number of power converters of FIG. 1 arranged to operate in a current sharing mode with respect to a common load, according to one illustrated embodiment.

FIG. 5 shows a number of power converters 500a, 500b (only two shown, collectively 500) of FIG. 1 electrically coupled in parallel to perform current sharing with respect to a common load 502, according to one illustrated embodiment.

The power converters 500 may be coupled to receive DC power from one or more DC power sources on input pins +VIN, VIN COM. For example, the power converters 500 may be coupled to receive power from a single DC source 504 as illustrated in FIG. 5. The DC source 504 may take any of a variety of forms including an output of a rectifier, an isolating conversion stage, a DC electrical power storage device such as an array of chemical battery cells or ultra-capacitors, or as illustrated a DC/DC converter. The DC source 504 may in turn receive power from an upstream DC source 506, for example a rectifier or power supply, and may receive a synchronization or clock signal on a synchronization input pin SYNC IN from a system clock 508. The DC source 504 may provide a synchronization or clock signal from a synchronization output pin SYNC OUT to the power converters 500 via respective synchronization input pins SYNC IN. Such may allow the oscillator ramp generator 114 (FIG. 1) of the power converter 500 to be synchronized with a system clock or with a bus voltage source of the system in which the power converter 500 is incorporated, thereby preventing the generation of low frequency (e.g., audio range) sub-harmonics.

As described above, each of the power converters 100a-100n may include a share input terminal SHARE to facilitate current sharing operation. In connecting the power converters 500 in parallel, one of the power converters is configured and functions as a master (illustrated as power converter 500a), while the other power converters are configured and function as slaves (illustrated as power converter 500b, only one slave shown).

In connecting the power converters 500 in parallel, the share pin SHARE is connected between the power converters, and all except the power converter 500a acting as the master will have trim pins TRIMA, TRIMB tied to the positive output voltage terminal +VOUT and the sense pin SENSE. The trim pins TRIMA, TRIMB of the power converter 500a acting as master are configured to set a desired output voltage or potential. The power converters 500b acting as slaves will match the current and voltage or potential of the power converter 500a acting as master. The power converter 500a acting as master will have the highest pre-set output voltage or potential (e.g., as illustrated in FIG. 5 both trim pins TRIMA, TRIMB of power converter 500a are open, for a 0.8 V output.)

Notably, the voltage or potential on the share pin SHARE is proportional to the output current supplied by the power converter 500, and thus may be used to monitor output current. Thus, the share pin SHARE can be used to drive a power converter 500 as a voltage controlled current source, where the output current will be proportional to the applied voltage with an offset.

Figure 6:
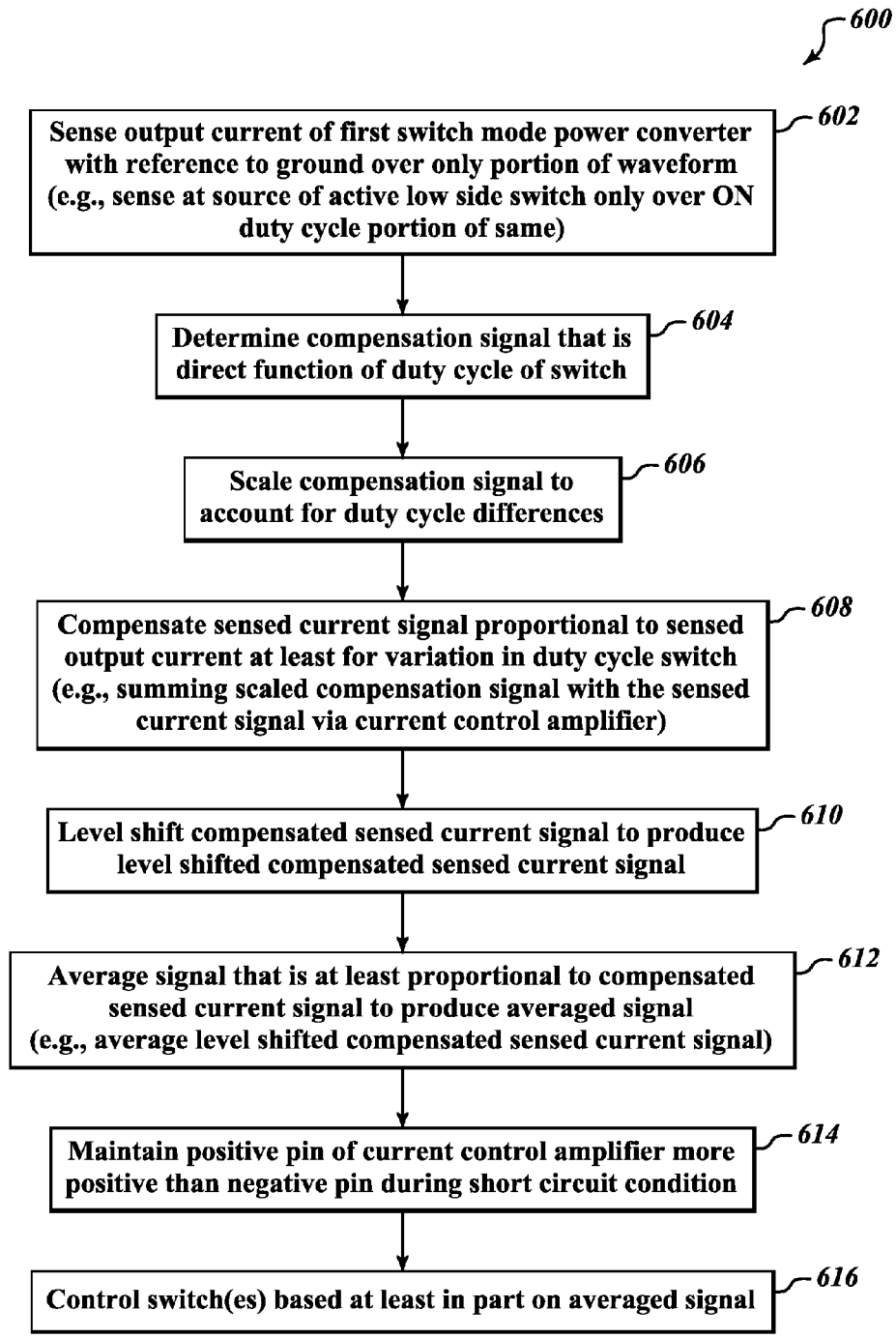
FIG. 6 is a flow diagram of a method of operating the power converter of FIGS. 1-3, according to one illustrated embodiment.

FIG. 6 shows a method 600 of operating the power converter of FIGS. 1-3, according to one illustrated embodiment. In particular, FIG. 6 illustrates operation of the inner current control loop.

At 602, a current sensor 116 senses output current of first switch mode power converter 100 with reference to ground over only portion of waveform. For example, the current sensor may sense current at a source of a low side active switch (e.g., MOSFET) T2, thus only over an ON duty cycle portion of the low side active switch T2.

At 604, a compensation circuit 120 determines a compensation signal that is direct function of a duty cycle of the switch. At 606, the compensation circuit 120 scales the compensation signal to account for duty cycle differences.

As previously described the compensation signal may compensate for the fact that the sensed current is sensed for only portion of the cycle when the low side active switch T2 is conducting or ON, during which time the high side active switch T1 is off. Thus, the compensation signal may reflect this difference in duty cycle, as the sum of 1–D.

At 608, a CL/CS resistor network 118 compensates a sensed current signal that is proportional to sensed output current at least for variation in duty cycle switch. For example, the CL/CS resistor network 118 may sum the scaled compensation signal with the sensed current signal. At 610, the CL/CS resistor network 118 level shifts the compensated sensed current signal to produce a level shifted compensated sensed current signal. The compensation and the level shifting may be performed concurrently, sequentially, or as part of a single operation (e.g., summing).

At 612, a current control amplifier 122 averages a signal that is at least proportional to compensated sensed current signal to produce averaged signal. For example, the current control amplifier 122 may average the level shifted compensated sensed current signal.

Optionally at 614, the values of select resistors maintain a positive pin of the current control amplifier U_CA more positive than a negative pin of the current control amplifier U_CA during a short circuit condition. Proper selection may provide short circuit protection, preventing a lock-on condition from occurring.

At 616, the synchronous gate timing drive control and PWM block 112 controls the switches T1, T2 based at least in part on averaged signal received from the current control amplifier 122.

The method 600 may repeat while the power converter 100 is operational, continually updating sensed values and applied signals.

Figure 7:
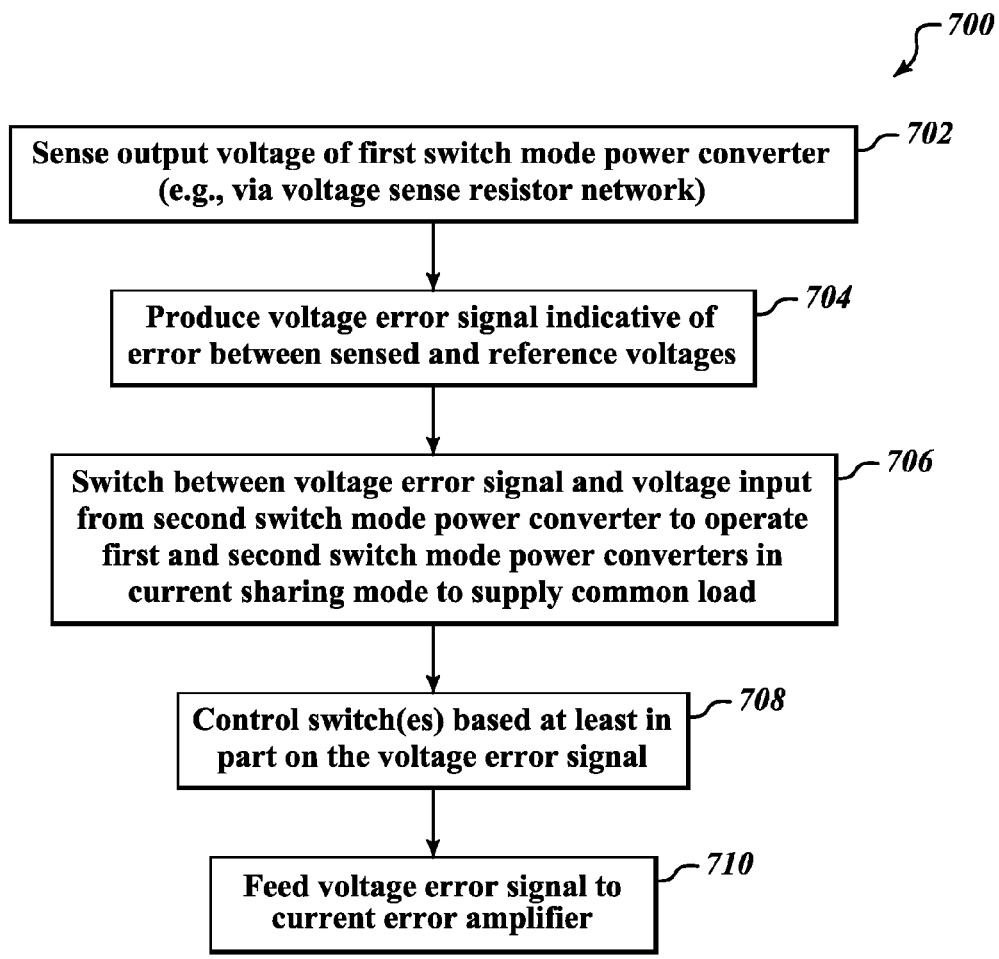
FIG. 7 is a flow diagram of a method of operating the power converter of FIGS. 1-3, according to one illustrated embodiment, which may be implemented as part of performing the method of FIG. 6.

FIG. 7 shows a method 700 of operating the power converter of FIGS. 1-3, according to one illustrated embodiment. In particular, FIG. 7 illustrates operation of the outer voltage control loop. The method 700 may be implemented as part of performing the method 600 of FIG. 6.

At 702, a voltage sensor senses output voltage or potential of first switch mode power converter. For example, the voltage sense resistor network 122 may sense the output voltage or potential.

At 704, a voltage error amplifier 126 produces a voltage error signal indicative of error between sensed voltage or potential and reference voltage or potential.

At 706, one or more switches (e.g., transistor Q1 of FIG. 2 or switches Q1, Q2 of FIG. 3) switch between voltage error signal and voltage input from second switch mode power converter to operate first and second switch mode power converters 500a, 500b (FIG. 5) in current sharing mode to supply common load.

At 708, the synchronous gate timing drive control and PWM block 112 (FIG. 1) controls the switches T1, T2 (FIG. 1) based at least in part on the voltage error signal generated by the voltage error amplifier.

At 710, a feedback voltage error signal is provided to the non-inverting input of the current error amplifier U_CA (FIGS. 2 and 3).

The described power converters 100 may provide a high-reliability, high-efficiency point of load converter, for example, for use with a 3.3 VDC input bus or a 5.0 VDC input bus. The power converters 100 include under voltage shutdown below 3.0 VDC and an over voltage shutdown above 6.0 VDC features to protect the powered system. The power converters 100 may have the flexibility to be set for any output voltage or potential within a specified range, for example from 0.64 VDC to 3.5 VDC without the need for any external components to achieve all specified performance levels. The power converters 100 may be capable of withstanding up to a 15 V transient for up to 1 second.

The described power converters 100 may have an accurate current overload feature to protect the power converter unit and load in critical fault conditions and improve system reliability. The described power converters 100 may also include a current share feature that allows multiple DC/DC power converters 100 to supply current to a single or common load, while maintaining a regulated voltage across the load. Total maximum output current in the share configuration is the sum of the maximum current provided by each individual power converter.

The specific values, such as specific voltages or potentials, used herein are purely illustrative, and are not meant to be in anyway limiting on the scope. Likewise, the arrangements and topologies are merely illustrative and other arrangements and topologies may be employed where consistent with the teachings herein. While specific circuit structures are disclosed, other arrangements that achieve similar functionality may be employed. The terms switched mode and switch mode are used interchangeable herein and in the claims.

The methods illustrated and described herein may include additional acts and/or may omit some acts. The methods illustrated and described herein may perform the acts in a different order. Some of the acts may be performed sequentially, while some acts may be performed concurrently with other acts. Some acts may be merged into a single act through the use of appropriate circuitry. For example, compensation and level shifting may be combined.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to commonly assigned U.S. patent applications:

Ser. No. 13/185,142, titled "POWER CONVERTER APPARATUS AND METHOD WITH COMPENSATION FOR LIGHT LOAD CONDITIONS";

Ser. No. 13/185,217, titled "SELF SYNCHRONIZING POWER CONVERTER APPARATUS AND METHOD SUITABLE FOR AUXILIARY BIAS FOR DYNAMIC LOAD APPLICATIONS";

Ser. No. 13/185,210, titled "INPUT CONTROL APPARATUS AND METHOD WITH INRUSH CURRENT, UNDER AND OVER VOLTAGE HANDLING";

Ser. No. 13/185,152, titled "OSCILLATOR APPARATUS AND METHOD WITH WIDE ADJUSTABLE FREQUENCY RANGE"; and Ser. No. 61/508,937, titled "POWER CONVERTER APPARATUS AND METHODS";

all filed on Jul. 18, 2011, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a first switch mode power converter, the method comprising:
sensing an output current of the first switch mode power converter with reference to a ground of a converter circuit of the first switch mode power converter over only a portion of a waveform of the output current;
determining a compensation signal that is a direct function of a duty cycle of a portion of the converter circuit of the first switch mode power converter;
compensating a sensed current signal that is proportional to the sensed output current at least for any variation in the duty cycle of the portion of the converter circuit of the first switch mode power converter by summing the compensation signal with the sensed current signal;
averaging a signal that is at least proportional to a compensated sensed current signal to produce an averaged signal; and
controlling the circuit of the first switch mode power converter based at least in part on the averaged signal.

2. The method of claim 1, further comprising:
level shifting the compensated sensed current signal to produce a level shifted compensated sensed current signal, wherein averaging a signal that is at least proportional to the compensated sensed current signal includes averaging the level shifted compensated sensed current signal.

3. The method of claim 1 wherein sensing an output current with reference to a ground of a converter circuit of the power converter over only a portion of a waveform of the output current includes sensing the output current with reference to the ground on a low side of a switch of the circuit.

4. The method of claim 1 wherein the switch mode power converter is a synchronous buck converter having an active high side switch and an active low side switch, and sensing an output current with reference to a ground of a converter circuit of the power converter over only a portion of a waveform of the output current includes sensing the output current with reference to the ground at a source of the active low side switch only over an ON duty cycle portion of the active low side switch.

5. The method of claim 1, further comprising scaling the compensation signal, wherein the duty cycle is the duty cycle of a high side switch of the converter circuit and scaling the compensation signal includes scaling the compensation signal to account for a voltage level offset.

6. The method of claim 1, further comprising:
sensing an output voltage or potential of the first switch mode power converter;
producing a voltage error signal indicative of an error between the sensed voltage and a reference voltage; and
controlling the converter circuit of the first switch mode power converter based at least in part on the voltage error signal.

7. The method of claim 6 wherein sensing an output voltage of the first switch mode power converter includes voltage sensing via a voltage sense resistor network.

8. The method of claim 6, further comprising:
switching between the voltage error signal and a voltage input from a second switch mode power converter to operate the first and the second switch mode power converters in a current sharing mode to supply a common load.

9. The method of claim 6 wherein the first switch mode power converter includes a current control amplifier, and a voltage error amplifier operable to produce the voltage error signal, and further comprising:
feeding the voltage error signal to the current control amplifier.

10. The method of claim 1 wherein the first switch mode power converter includes a current control amplifier having a positive pin and a negative pin, the current control amplifier operable to produce the averaged signal, the method further comprising:

maintaining the positive pin of the current control amplifier more positive than the negative pin of the current control amplifier during any short circuit condition.

11. A first switch mode power converter, comprising:
a converter circuit including at least one inductor and at least a first active switch;
an output current sensor that senses an output current of the converter circuit with reference to a ground of the converter circuit over only a portion of a waveform of the output current;
a compensation circuit coupled to receive a sensed current signal that is proportional to the sensed output current from the output current sensor and coupled to receive a signal that is a direct function of a duty cycle of a portion of the converter circuit, the compensation circuit determines a compensation signal that is a direct function of the duty cycle of the portion of the converter circuit and sums the compensation signal with the sensed current signal;
a current control amplifier that averages the signal that is at least proportional to a compensated sensed current signal to produce an averaged signal; and
a drive controller coupled to the current control amplifier to receive the averaged signal and is coupled to drive at least the first active switch of the converter circuit based at least in part on the averaged signal produced by the current control amplifier.

12. The first switch mode power converter of claim 11 wherein the compensation circuit level shifts the compensated sensed current signal, and the current control amplifier is coupled to receive a level shifted compensated sensed current signal from the compensation circuit.

13. The first switch mode power converter of claim 11 wherein the first active switch is a high side switch and the converter circuit includes at least a second active switch which is a low side switch, and wherein the output current sensor senses the output current with reference to the ground on a low side of the low side active switch.

14. The first switch mode power converter of claim 11, further comprising:
a voltage error amplifier coupled to receive a signal indicative of an output voltage of the converter circuit and a signal indicative of at least a reference voltage, the voltage error amplifier operable to provide a voltage error signal indicative of an error between the output voltage and the reference voltage to the current control amplifier.

15. The first switch mode power converter of claim 14, further comprising:
a voltage sense resistor network coupled to provide the signal indicative of the output voltage to the voltage error amplifier.

16. The first switch mode power converter of claim 14 wherein the compensation circuit includes a switch that selectively couples an input of the current control amplifier to a node between an output of the voltage error amplifier and a shared line, the shared line coupleable to receive a voltage input from a second switch mode power converter to operate the first and the second switch mode power converters in a current sharing mode to supply current in parallel to a common load.

17. The first switch mode power converter of claim 14 wherein an output of the voltage error amplifier is coupled to an input of the current control amplifier.

18. The first switch mode power converter of claim 11 wherein the compensation circuit includes a common emitter stage that drives a shared line when configured as a master that is able to supply a voltage output from the first switch mode power converter through a share pin to operate a second switch mode power converter configured as a slave through a slave pin thereof in a current sharing mode to supply a common load.

19. The first switch mode power converter of claim 11 wherein the current control amplifier has a positive pin and a negative pin, and further comprising:
a number of resistors selected and coupled to maintain the positive pin of the current control amplifier more positive than the negative pin of the current control amplifier during a short circuit condition.

20. A method of operating a first switch mode power converter that includes a current control amplifier having a positive pin and a negative pin, the method comprising:
sensing an output current of the first switch mode power converter with reference to a ground of a converter circuit of the first switch mode power converter over only a portion of a waveform of the output current;
compensating a sensed current signal that is proportional to the sensed output current at least for any variation in a duty cycle of a portion of the converter circuit of the first switch mode power converter;
averaging a signal by the current control amplifier, the signal being at least proportional to a compensated sensed current signal, to produce an averaged signal;
maintaining the positive pin of the current control amplifier more positive than the negative pin of the current control amplifier during any short circuit condition; and
controlling the circuit of the first switch mode power converter based at least in part on the averaged signal.

21. A first switch mode power converter, comprising:
a converter circuit including at least one inductor and at least a first active switch;
an output current sensor that senses an output current of the converter circuit with reference to a ground of the converter circuit over only a portion of a waveform of the output current;
a compensation circuit coupled to receive a sensed current signal that is proportional to the sensed output current from the output current sensor and to compensate the sensed current signal at least for any variation in a duty cycle of the first active switch of the converter circuit;
a current control amplifier that averages the signal that is at least proportional to a compensated sensed current signal to produce an averaged signal, the current control amplifier includes a positive pin and a negative pin;
a number of resistors selected and coupled to maintain the positive pin of the current control amplifier more positive than the negative pin of the current control amplifier during a short circuit condition; and
a drive controller coupled to the current control amplifier to receive the averaged signal and is coupled to drive at least the first active switch of the converter circuit based at least in part on the averaged signal produced by the current control amplifier.

* * * * *